J. F. HAFFEY.
DEVICE FOR FEEDING POULTRY.
APPLICATION FILED MAR. 13, 1912.
1,069,943.
Patented Aug. 12, 1913.
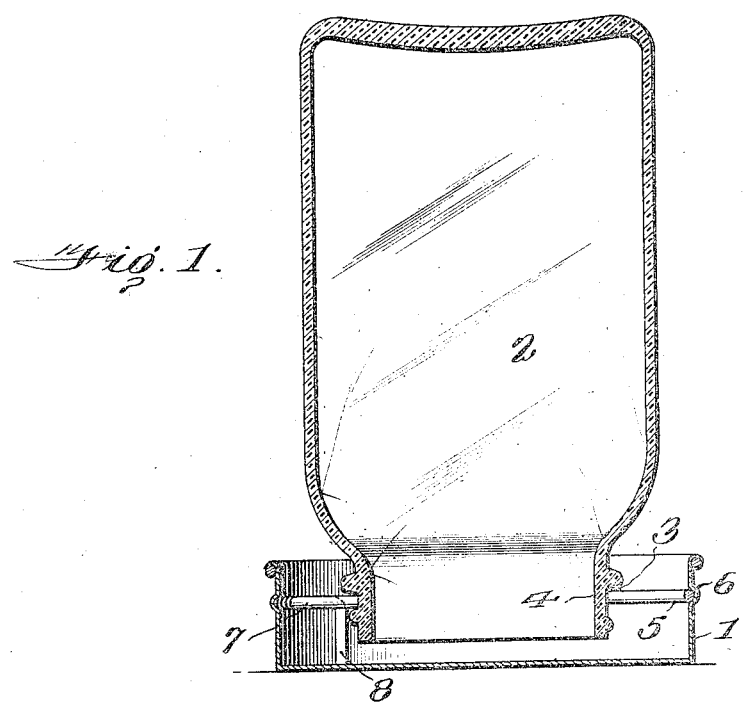
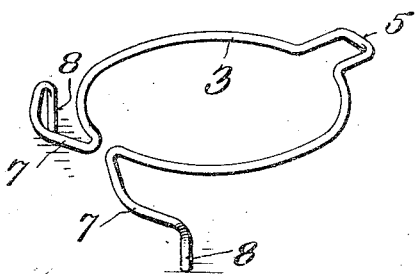
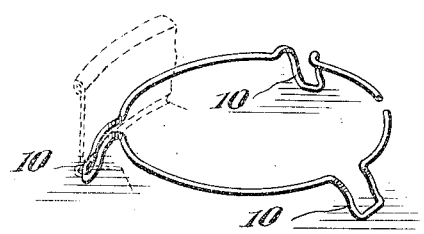
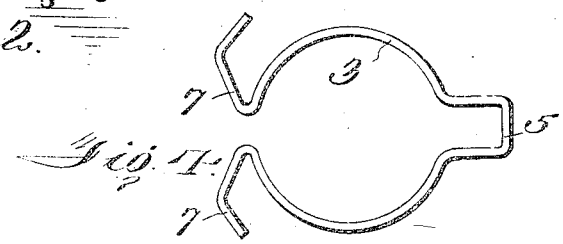
Witnesses
Inventor
James F. Haffey
By J. R. Nottingham
Attorney

UNITED STATES PATENT OFFICE.

JAMES F. HAFFEY, OF TIFFIN, OHIO.

DEVICE FOR FEEDING POULTRY.

1,069,943.   Specification of Letters Patent.   Patented Aug. 12, 1913.

Application filed March 13, 1912. Serial No. 683,594.

*To all whom it may concern:*

Be it known that I, JAMES F. HAFFEY, a citizen of the United States, residing at Tiffin, in the county of Seneca and State of Ohio, have invented certain new and useful Improvements in Devices for Feeding Poultry; and I do hereby declare the following to be a full, clear, and exact description of the invention, such as will enable others skilled in the art to which it appertains to make and use the same.

The invention relates generally to devices for feeding poultry, but is specially adapted as a drinking fountain, and it consists of a novel support or stand by means of which a water or feed reservoir is supported in a suitable trough in such a manner that the water or feed will be automatically fed thereto.

The chief object of the invention is to supply poultry with drinking water or grain, freed as much as possible from dust and dirt.

Another object of the invention is to provide a support which will maintain the open end or mouth of the reservoir a distance from the bottom of the trough sufficient to allow the water or grain to flow freely into the same.

In the drawings—Figure 1 is a central, vertical section of my improved device; Fig. 2, a perspective view of the support shown in Fig. 1; Figs. 3 and 4 modified forms of the support, and Fig. 5 a vertical section of the trough showing the form of support shown in Fig. 4.

In the several views, particularly Fig. 1, the numeral 1 indicates the trough; 2 the reservoir, and 3 the stand or support for the reservoir. The stand as shown in Figs. 1 and 2 is made of a single piece of spring wire, preferably circular in shape to close around the neck 4 of the reservoir, said neck being screw-threaded to adapt the support to be screwed thereon, and is bent to form an arm 5 adapted to enter a seat or groove 6 in the side wall of the trough. The respective ends of the stand are bent back upon the body of the stand to form arms 7 to engage said groove 6 in the side wall of the trough, and then downwardly to form legs 8, 8, which rest upon the bottom of the trough to form an additional support for the stand. The groove in the side wall of the trough is formed at such a height above the bottom of the trough as will support the mouth of the reservoir, when properly seated in the support, a sufficient distance away from the bottom of said trough to allow the water or grain to flow freely therein. The spring action of the stand clamps the reservoir tightly around the neck, and forces the arms into close engagement with the groove 6, so that, assisted by the legs 8, the reservoir will be firmly supported by the stand.

In operation, the stand is placed around the neck of the reservoir and the reservoir filled with water or grain, as the case may be; the trough is then placed in position by inserting the arms 5 and 7 into the groove 6, the diameter of the trough being much greater than that of the neck of the reservoir it will be seen that ample space will be afforded the poultry to drink or feed.

In the form shown in Fig. 3, the engaging arms 10, 10, 10 project downwardly and engage the groove 6, which is placed at the bottom of the wall the arms being of strength sufficient to support the reservoir the required distance from the bottom of the trough.

In the form shown in Fig. 4 the legs 8 are dispensed with.

It will be noted that all of the supports are spring-acting so as to firmly clamp the reservoir, around the neck thereof.

Having thus fully described my invention, what I claim is—

1. A poultry-feeding device having in combination, a suitable trough provided with a seat, and a support consisting of a single piece of spring wire bent in the form of a partial circle, the circular portion being bent to form a seat-engaging arm, and its free or open ends also bent to form seat-engaging arms, so as to support a feed-receptacle.

2. A poultry-feeding device, comprising a trough having the inner surface of its side wall provided with an annular groove, a reservoir having an open end, and a support made of a single piece of spring wire bent to encircle the reservoir and form projecting engaging-arms adapted to be forced into engagement with said groove by the spring-action of the support, and thereby support the reservoir.

3. A poultry-feeding device, comprising a trough having the inner surface of its side wall provided with an annular groove, a reservoir having an open end, and a support made of a single piece of spring wire bent to encircle the reservoir and to form projecting engaging-arms adapted to be forced into engagement with said groove, two of said arms being bent to form legs as an additional support.

In testimony whereof I affix my signature, in the presence of two witnesses.

JAMES F. HAFFEY.

Witnesses:
JAMES L. CRAWFORD,
J. R. NOTTINGHAM.